No. 672,219. Patented Apr. 16, 1901.
A. L. STEVENS.
ELECTRIC BATTERY.
(Application filed May 28, 1900.)
(No Model.) 2 Sheets—Sheet 1.
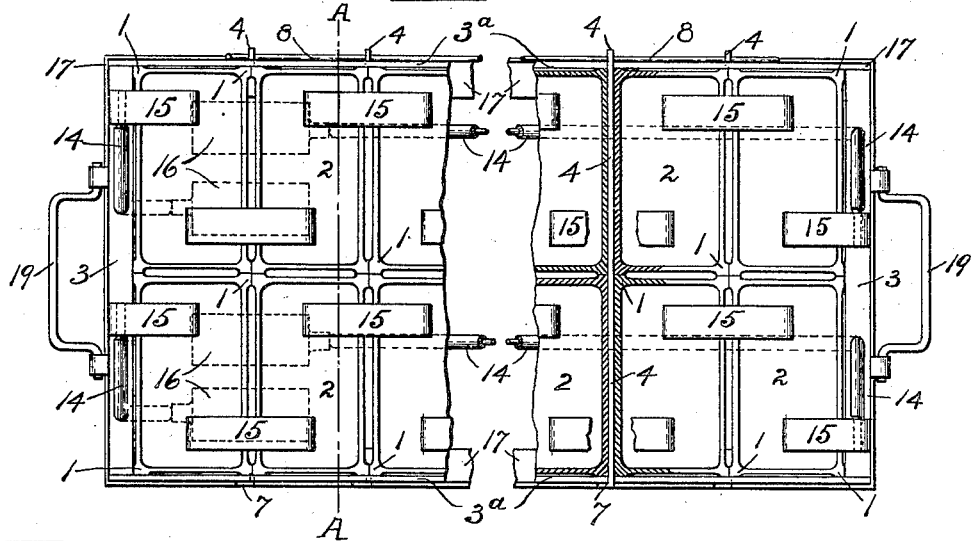
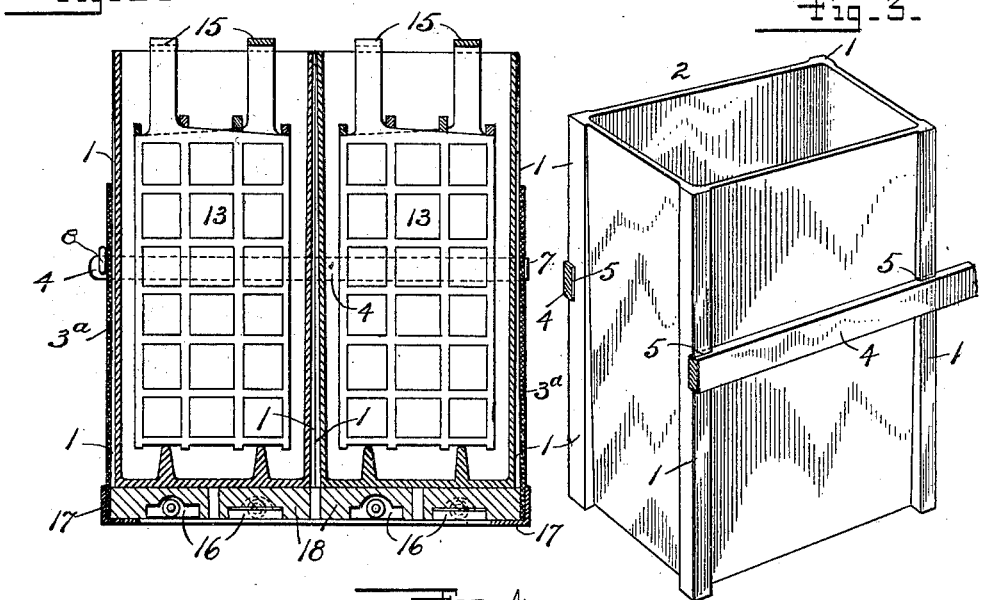
WITNESSES: INVENTOR
Arthur L. Stevens,
BY
Alvin K. Goodwin,
ATTORNEY

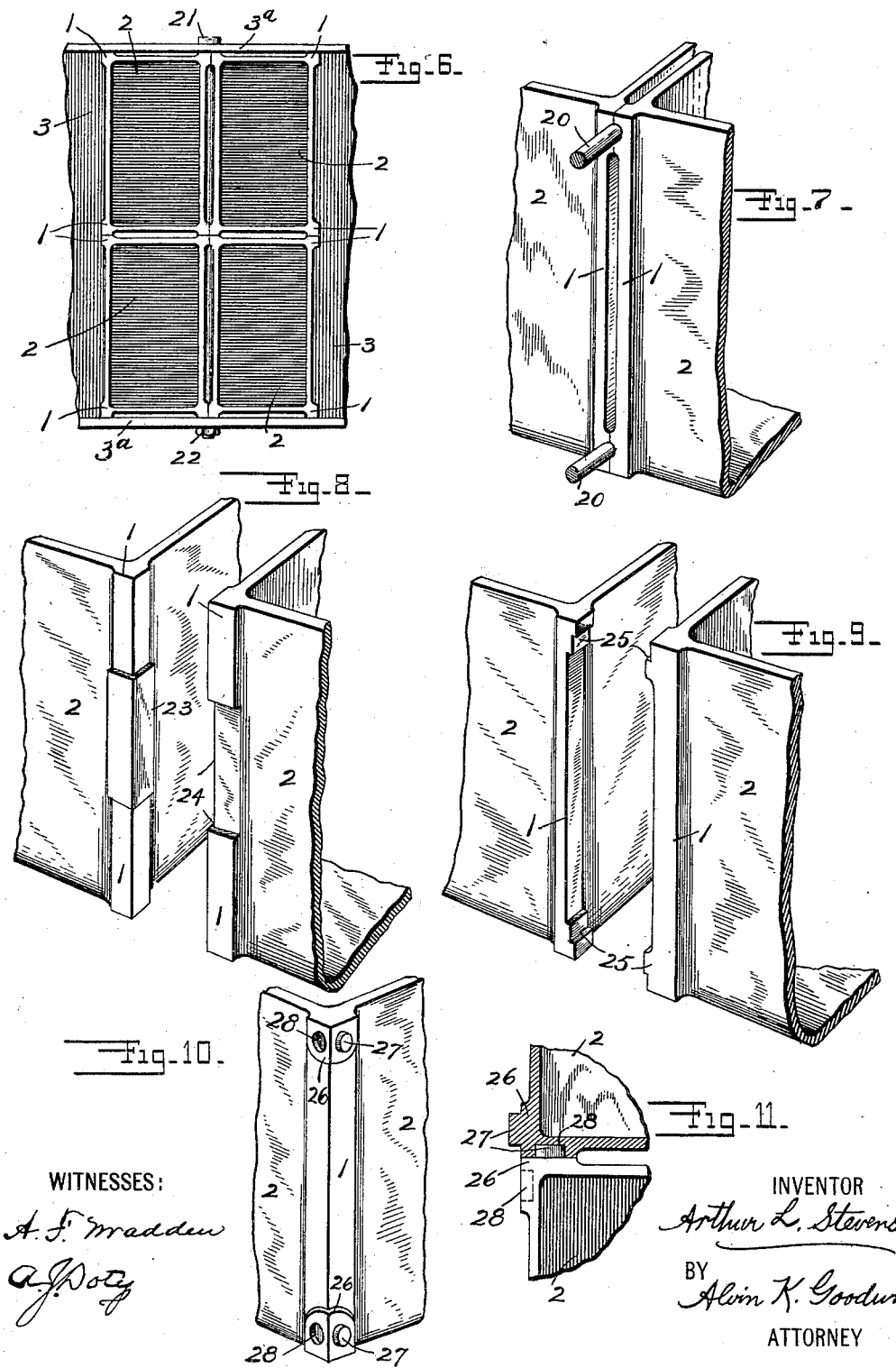

UNITED STATES PATENT OFFICE.

ARTHUR L STEVENS, OF NEW YORK, N. Y.

ELECTRIC BATTERY.

SPECIFICATION forming part of Letters Patent No. 672,219, dated April 16, 1901.

Application filed May 28, 1900. Serial No. 18,302. (No model.)

*To all whom it may concern:*

Be it known that I, ARTHUR L STEVENS, a citizen of the United States of America, residing in the borough of Manhattan, city of New York, State of New York, have invented certain new and useful Improvements in Electric Batteries, of which the following is a specification.

This invention relates to electric batteries, and more particularly to portable storage batteries used in automobile vehicles, and has for its main object to prevent independent lateral and vertical movement of the battery-cells, thereby obviating overstraining or breaking of the conductive connections between the plates or elements of adjacent cells and assuring maximum efficiency and durability of the battery. I accomplish this object by so forming the battery-cells that they mutually brace or stay each other laterally, and preferably also fit against the side walls of the battery-box containing them. I also interlock the cells to each other vertically, so that they constitute practically a unitary structure or group of cells, each one of which by its weight anchors or holds down the adjacent cell or cells within the battery-box. I also preferably lock the cells to the battery-box, thus more effectually preventing their vertical movement, while strengthening the box-walls, which therefore may be made lighter than usual to reduce weight and save space.

I first will describe the invention and then will particularly define it in the appended claims.

Reference is made to the accompanying drawings, forming part of this specification, and in which—

Figure 1 is a plan view, partly sectional, of opposite end portions of a storage battery having two rows of laterally-braced cells with their plates removed and the cells vertically locked together and to the battery-box. Fig. 2 is a vertical transverse section taken on line A A in Fig. 1 with the plates shown in the battery-cells. Fig. 3 is an enlarged perspective view of one of these cells with portions of the locking-keys fitted thereto. Fig. 4 is a perspective view of the locking-key shown in Figs. 1 and 2. Fig. 5 is a vertical detail sectional view showing another form of key fitted to opposite walls of the battery-box. Fig. 6 is a detail plan view showing four laterally-braced cells vertically interlocked to each other and to the battery-box by bolt-keys. Fig. 7 is a detail perspective view illustrating two such round bolt-keys vertically interlocking adjacent battery-cells at top and bottom. Fig. 8 is a detail perspective view showing how adjoining laterally-braced cells may vertically interlock by tongue-and-groove joint of portions of the cell-walls. Fig. 9 is a detail perspective view illustrating a rabbeted vertical interlocking of laterally-braced adjoining cells at top and bottom. Fig. 10 is a detail perspective view showing interlocking pin-and-hole joints at top and bottom of a cell, and Fig. 11 is a detail sectional plan view of laterally-braced corners of adjacent cells having said pin-and-hole lock.

Battery-cells made of rubber or its compounds or glass or other substance are usually cast or molded endwise and are tapered more or less from top to bottom to give draft, facilitating their removal from the mold. Whatever be the general form of the cell this taper forbids proper mutual bracing of the cells when grouped in a battery-box, and therefore the cells of a vehicle-battery have been more or less free to move laterally and vertically, with the result of often overstraining the connections between the plates of adjacent cells and impairing the conductivity of these connections and lessening the efficiency of the battery or breaking these conductive connections and putting the entire battery out of service. The drawings represent various simple and efficient constructions operating in accordance with the cell-bracing and locking features of my invention. For laterally bracing the cells I produce on their exterior parts liable to contact with each other and with the battery-box a series of ribs or pads, and for vertically locking the cells I may employ transverse keys engaging slots or keyways in the cell ribs or walls, and I prefer to utilize these keys for locking the entire group of cells in a battery-box down to the box-floor, or I may vertically interlock adjacent cells by lateral tongue-and-groove or pin-and-hole joints, as hereinafter more fully described.

Referring first to Figs. 1 to 5 of the drawings, the numeral 1 indicates laterally-projecting ribs on the four corners of the battery-cells 2. As here shown, these ribs extend continuously from top to bottom of the cells and brace them laterally in both directions against each other and the battery-box 3. Said ribs 1 are originally molded tapering like the main body of the cell to give them like draft for easy withdrawal from the mold, and afterward the ribs are cut or ground off, so that their exterior faces stand parallel vertically and about at right angles with the top and bottom of the cell. The group of cells in any battery-box thus will laterally brace each other and be likewise braced against the side walls of the box. The grouped cells have a practical unity or continuity in both directions which effectually prevents lateral movement or jarring of them in the battery-box.

The above-named lateral bracing or continuity of the cells is of itself an important feature; but I supplement it by a further improvement consisting in vertically locking the cells to each other so as to prevent their independent vertical movement in the battery-box. As shown in Figs. 1 to 4 of the drawings, I may use transverse keys 4, fitted to horizontal slots or keyways 5, made in the cell-walls and preferably in the laterally-bracing ribs 1. The keys are about twice as thick as the depth of the cell-slots. Hence with two rows of cells each key interlocks four adjacent cells, and with one row of cells each key will interlock two adjacent cells.

The weight of the mutually-braced and key-locked cells may under ordinary conditions of use keep them all down to the bottom of the battery-box; but to assure this desirable stability I pass the keys 4 through apertures made for them in the battery-box side walls 3ª. I further utilize these keys for holding said walls 3ª snugly to the group of laterally-braced cells 2 by providing suitable detents for the keys outside of said walls. The keys and detents permit making the walls 3ª much lighter than usual to desirably reduce the gross weight of the battery and also gain space in the vehicle-body carrying the battery. The key-detents may have any form, such as heads 7 at one end of the keys, and pins or a continuous latch-rod 8 passed through holes 9 at the other end of the keys, as shown in Figs. 1, 2, and 4 of the drawings, or keys 10, shown in Fig. 5 and having a suitable head 7 at one end and a notched latch-head 11 at the other end, may be used. This latch-head is passed through a slot in the box-wall 3ª and may be overlocked by any suitable adjustable catch 12, having a lip entering the slot above the key. The keys may readily be withdrawn to permit removing the cells 2 from the battery-box for interchange or repairs.

The cell plates or electrodes 13 are conductively coupled to each other and to the battery-wires 14 by connections 15 of any suitable character. These wires 14 lead to bottom contacts 16, shown let in flush with the bottom face of the battery-box. I do not specially claim these bottom-face contacts in this application for patent. The box has a surrounding base-frame 17, of angle-iron, to which and to the wood slat floor 18 the battery-box handles 19 are strongly fastened.

In Figs. 6 and 7 of the drawings I show how adjacent battery-cells 2 may be vertically interlocked by using round keys 20, entering corresponding slots formed in the laterally-bracing ribs 1 at top and bottom of the cells. These keys here have the form of bolts whose heads 21 and removable nuts 22 overlie and brace the opposite thinner side walls 3ª of the battery-box 3. Fig. 7 shows also how the cell-ribs 1 may be cut away to provide small lateral bracing-pads meeting each other at top and bottom of the cells.

In Fig. 8 of the drawings I show how adjacent cells 2 may be vertically interlocked by a tongue 23 on one cell entering a groove 24 in the next cell. Said tongue-and-groove connection may also constitute coöperative laterally-bracing contact-surfaces of the cells, and thus may both laterally brace and vertically interlock the cells. I show the tongue and groove conjointly with laterally-bracing ribs 1 and as arranged to interlock four cells at points of contact between them.

In Fig. 9 of the drawings are shown upper and lower rabbeted portions 25 of adjacent cells 2, which interlock the cells vertically and may also serve as laterally-bracing points of contact for the cells.

Figs. 10 and 11 show how the cells may have corner projections or pads 26, provided with pins 27 and holes 28. These pins and holes engage each other when the pads are in contact, whereby adjacent cells laterally brace and vertically interlock each other.

For battery-cell constructions (sufficiently indicated in Figs. 8, 9, 10, and 11 of the drawings) the box-walls may have projections or depressions corresponding with possible opposing tongue-and-groove or rabbeted portion or pin-and-hole formation of the opposing walls of the battery-cells to engage therewith for vertically locking the braced and interlocked group of cells to the battery-box.

It thus will appear that the above-described improvements provide a battery in which the box and all the contained cells form practically a semirigid mutually-braced structure which assures safety of the contacts 15 of battery-plates 13 from overstraining or breaking by jars incident to travel of a vehicle propelled by the battery and connected motor, and consequently the maximum efficiency of the battery and motor always is attainable and dangerous accidents and annoying delays are avoided.

There are widely-recognized advantages in the use of one-piece battery-cells as compared with cells or boxes made with an interior body portion of wood or wood-pulp or fiber or metal and impregnated or coated with various silicious compounds and at times having interior sheet-glass walls with specially sealed joints. The preferred one-piece cells are quite as acid-proof and durable and are much lighter and very much cheaper than said built-up battery cells or boxes. Hence the almost universal use of such one-piece cells for portable secondary batteries. The cheapness and general desirability of these one-piece cells arise largely from the fact of their being molded into form. Thus molding them generally requires them to be tapered downward to permit their withdrawal from the mold. By specially furnishing such tapering molded cells with the laterally-bracing ribs or projections I am able to retain all the advantages of cheapness, lightness, and durability of the cells, while providing for most effective lateral bracing of the grouped cells in a battery-box, and also through the medium of said lateral ribs or projections permitting a preferred simple and practical mutual vertical interlocking of the cells to each other and preferably also to the battery-box, as above described. By these means I specially assure the integrity and efficiency of the electrically-conductive connections between plates of adjacent cells of a battery which is a most important consideration.

I claim as my invention—

1. An electric-battery cell or vessel adapted to receive battery plates or electrodes and having lateral ribs or projections adapted, by direct contact with similarly-ribbed cells and the battery-box, to prevent horizontal movement of all the cells of a battery.

2. An electric-battery cell or vessel formed in one downwardly-tapering piece adapted to receive battery plates or electrodes and having lateral ribs or projections adapted, by direct contact with similarly-ribbed cells and the battery-box, to prevent horizontal movement of all the cells of a battery.

3. An electric-battery cell or vessel formed in one downwardly-tapering piece adapted to receive battery plates or electrodes and having integral lateral ribs or projections adapted, by direct contact with similarly-ribbed cells and the battery-box, to prevent horizontal movement of all the cells of a battery.

4. An electric-battery cell or vessel adapted to receive battery plates or electrodes and having lateral ribs or projections adapted, by direct contact with similarly-ribbed cells and the battery-box, to prevent horizontal movement of all the cells of a battery; said cell also having means providing for mutual interlocking of adjacent battery-cells against independent vertical movement.

5. An electric-battery cell or vessel adapted to receive battery plates or electrodes and formed in one downwardly-tapering piece having lateral ribs or projections adapted, by direct contact with similarly-ribbed cells and the battery-box, to prevent horizontal movement of all the cells of a battery; said cell also having means providing for mutual interlocking of adjacent battery-cells against independent vertical movement.

6. An electric-battery cell or vessel adapted to receive battery plates or electrodes and formed in one downwardly-tapering piece having integral lateral ribs or projections adapted, by direct contact with similarly-ribbed cells and the battery-box, to prevent horizontal movement of all the cells of a battery; said cell also having means providing for mutual interlocking of adjacent battery-cells against independent vertical movement.

7. An electric-battery cell or vessel adapted to receive battery plates or electrodes and having lateral ribs or projections adapted, by direct contact with similarly-ribbed cells and the battery-box, to prevent horizontal movement of all the cells of a battery; said cell also having means coöperative with a transverse key for mutually interlocking adjacent battery-cells against independent vertical movement.

8. An electric-battery cell or vessel adapted to receive battery plates or electrodes and formed in one downwardly-tapering piece having lateral ribs or projections adapted, by direct contact with similarly-ribbed cells and the battery-box, to prevent horizontal movement of all the cells of a battery; said cell also having means coöperative with a transverse key for mutually interlocking adjacent battery-cells against independent vertical movement.

9. An electric-battery cell or vessel adapted to receive battery plates or electrodes and formed in one downwardly-tapering piece having integral lateral ribs or projections adapted, by direct contact with similarly-ribbed cells and the battery-box, to prevent horizontal movement of all the cells of a battery; said cell also having means coöperating with a transverse key for mutually interlocking adjacent battery-cells against independent vertical movement.

10. An electric battery comprising a box, cells therein, plates in the cells, conductive connections between the plates of adjacent cells, and means substantially as described for mutually bracing the cells against horizontal movement and for locking the cells against vertical movement, thereby preventing overstraining or breaking of said conductive connections.

11. An electric battery comprising a box, a group of cells therein each having lateral ribs or projections in direct contact with similarly-ribbed cells and the battery-box to prevent horizontal movement of the cells, plates or electrodes in the cells, and conductive connections between plates of adjacent cells of the battery.

12. An electric battery comprising a box, a group of cells therein each cell formed in one downwardly-tapering piece having lateral ribs or projections in direct contact with similarly-ribbed cells and the battery-box to prevent horizontal movement of the cells, plates or electrodes in the cells, and conductive connections between plates of adjacent cells of the battery.

13. An electric battery comprising a box, a group of cells therein each cell formed in one downwardly-tapering piece having integral lateral ribs or projections in direct contact with similarly-ribbed cells and the battery-box to prevent horizontal movement of the cells, plates or electrodes in the cells, and conductive connections between plates of adjacent cells of the battery.

14. An electric battery comprising a box, a group of cells therein each cell having lateral ribs or projections in direct contact with similarly-ribbed cells and the battery-box to prevent horizontal movement of the cells, plates or electrodes in the cells, conductive connections between plates of adjacent cells of the battery, and means interlocking the cells against independent vertical movement in the battery-box.

15. An electric battery comprising a box, a group of cells therein each cell formed in one downwardly-tapering piece having lateral ribs or projections in direct contact with similarly-ribbed cells and the battery-box to prevent horizontal movement of the cells, plates or electrodes in the cells, conductive connections between plates of adjacent cells of the battery, and means interlocking the cells against independent vertical movement in the battery-box.

16. An electric battery comprising a box, a group of cells therein each cell formed in one downwardly-tapering piece having integral lateral ribs or projections in direct contact with similarly-ribbed cells and the battery-box to prevent horizontal movement of the cells, plates or electrodes in the cells, conductive connections between plates of adjacent cells of the battery, and means interlocking the cells against independent vertical movement in the battery-box.

17. An electric battery comprising a box, a group of cells therein each cell having lateral ribs or projections in direct contact with similarly-ribbed cells and the battery-box to prevent horizontal movement of the cells, plates or electrodes in the cells, conductive connections between plates of adjacent cells of the battery, and a transverse key engaging coöperative means at the cell-walls and mutually interlocking the laterally-braced cells against independent vertical movement in the battery-box.

18. An electric battery comprising a box, a group of cells therein each cell formed in one downwardly-tapering piece having lateral ribs or projections in direct contact with similarly-ribbed cells and the battery-box to prevent horizontal movement of the cells, plates or electrodes in the cells, conductive connections between plates of adjacent cells of the battery, and a transverse key engaging coöperative means at the cell-walls and mutually interlocking the laterally-braced cells against independent vertical movement in the battery-box.

19. An electric battery comprising a box, a group of cells therein each cell formed in one downwardly-tapering piece having integral lateral ribs or projections in direct contact with similarly-ribbed cells and the battery-box to prevent horizontal movement of the cells, plates or electrodes in the cells, conductive connections between plates of adjacent cells of the battery, and a transverse key engaging coöperative means at the cell-walls and mutually interlocking the laterally-braced cells against independent vertical movement in the battery-box.

20. A battery comprising a box, cells therein having a slot or keyway, and a key engaging the cell-slots and box-walls.

21. A battery comprising a box, cells therein having a transverse slot or keyway, a key engaging the cell-slots and box-walls, and detents for the key outside of and bracing the box-walls.

22. A battery comprising a box, cells therein having laterally-bracing ribs or projections and a transverse slot or keyway, and a key engaging the cell-slots and box-walls.

23. A battery comprising a box, cells therein having laterally-bracing ribs or projections and a transverse slot or keyway, a key engaging the cell-slots and box-walls, and detents for the key outside of and bracing the box-walls.

ARTHUR L. STEVENS.

Witnesses:
A. F. MADDEN,
A. J. DOTY.